(12) United States Patent
Angiulli et al.

(10) Patent No.: US 10,240,677 B2
(45) Date of Patent: Mar. 26, 2019

(54) GASKET

(71) Applicant: FREUDENBERG SEALING TECHNOLOGIES S.A.S. DI EXTERNA ITALIA S.R.L.U, Pinerolo (IT)

(72) Inventors: Pasquale Angiulli, Pinerolo (IT); Luca Breusa, Pinerolo (IT); Massimo Barban, Pinerolo (IT); Stefano Miletto, Pinerolo (IT); Maurizio Buro, Pinerolo (IT); Andrea Berta, Pinerolo (IT)

(73) Assignee: FREUDENBERG SEALING TECHNOLOGIES S.A.S. DI EXTERNA ITALIA S.R.L.U (IT)

(*) Notice: Subject to any disclaimer, the term of this patent is extended or adjusted under 35 U.S.C. 154(b) by 314 days.

(21) Appl. No.: 15/091,898

(22) Filed: Apr. 6, 2016

(65) Prior Publication Data

US 2016/0298769 A1    Oct. 13, 2016

(30) Foreign Application Priority Data

Apr. 7, 2015 (IT) .............................. TO2015A0201

(51) Int. Cl.
*F16J 15/3232* (2016.01)
*F16C 33/78* (2006.01)
(Continued)

(52) U.S. Cl.
CPC ....... *F16J 15/3232* (2013.01); *F16C 33/7813* (2013.01); *F16C 33/7823* (2013.01);
(Continued)

(58) Field of Classification Search
CPC .. F16J 15/3252; F16J 15/3256; F16J 15/3268; F16C 33/7813; F16C 33/7823; F16C 33/805
(Continued)

(56) References Cited

U.S. PATENT DOCUMENTS 2,883,224 A * 4/1959 Riesing .................... F16J 15/32
277/394
5,096,207 A * 3/1992 Seeh .................... F16J 15/3256
277/353
(Continued)

FOREIGN PATENT DOCUMENTS

DE        19539056      11/1996
EP         1055850      11/2000
(Continued)

OTHER PUBLICATIONS

Corresponding Italian Search Report for IT TO20150201 dated Nov. 26, 2015. IT.

*Primary Examiner* — Nathan Cumar
(74) *Attorney, Agent, or Firm* — The Belles Group, P.C.

(57) ABSTRACT

A gasket for sealing a compartment between rotating and fixed members. The gasket has a first ring; a second ring radially more external than the first ring; a first annular elastomeric element carried by the first ring and defining at least a first annular sealing lip cooperating with the second ring to counter the passage of external contaminants inside the compartment; a second annular elastomeric element carried by the second ring and defining at least a second annular sealing lip cooperating with the first ring to counter the passage of lubricant to the outside; a third ring coupled to the second ring and extending from this latter towards the axis of the gasket; and at least a third annular sealing lip, overhangingly projecting from the first elastomeric element and cooperating with the third ring to counter the passage of external contaminants from the outside towards the first sealing lip.

20 Claims, 5 Drawing Sheets

(51) Int. Cl.
*F16J 15/3256* (2016.01)
*F16J 15/3268* (2016.01)
*F16C 33/80* (2006.01)
*F16C 19/36* (2006.01)

(52) U.S. Cl.
CPC ......... *F16C 33/805* (2013.01); *F16J 15/3256* (2013.01); *F16J 15/3268* (2013.01); *F16C 19/364* (2013.01); *F16C 33/7886* (2013.01)

(58) Field of Classification Search
USPC ................ 277/652, 345, 349–351, 353, 394
See application file for complete search history.

(56) References Cited

U.S. PATENT DOCUMENTS

| | | | |
|---|---|---|---|
| 5,649,710 A * | 7/1997 | Kanda ................ | F16J 15/3256 277/371 |
| 6,450,503 B1 * | 9/2002 | Dossena .............. | F16J 15/3256 277/549 |
| 7,658,386 B2 * | 2/2010 | Oldenburg ........... | F16J 15/3256 277/353 |
| 7,712,745 B2 * | 5/2010 | Clark .................. | F16J 15/3256 277/551 |
| 2002/0011710 A1 | 1/2002 | Oldenburg | |

FOREIGN PATENT DOCUMENTS

| EP | 2799743 | 11/2014 |
|---|---|---|
| JP | 2010265949 | 11/2010 |

\* cited by examiner

GASKET

CROSS-REFERENCE TO RELATED APPLICATIONS

The present application claims priority under 35 U.S.C. § 119 to Italian Patent Application No. TO2015A000201, filed Apr. 7, 2015, the entirety of which is incorporated herein by reference.

FIELD OF THE INVENTION

The present invention relates to a sealing gasket, in particular of the cassette type, for sealing a compartment between a rotating member and a fixed member, so as to prevent the passage of lubricant from a first ambient to a second ambient, arranged on opposite sides of said compartment, and to counter the passage of external contaminants from the second ambient to the first ambient.

BACKGROUND OF THE INVENTION

They are known cassette gaskets of the above type, suitable to be used in working vehicles, such as tractors or earth-moving machines, under extremely severe operating conditions, characterized for example by:
  intermittent operation of the motor, i.e. with continuous passages from a start condition to a stop condition and vice versa;
  continuous back and forth movements of the vehicles, with angular movements in opposite directions of the rotating members on which the cassette gaskets are applied;
  partial immersion of the vehicles in mud;
  adverse weather conditions; and
  relatively high circumferential speed of the rotating members on which the cassette gaskets are applied.

An example of a cassette gasket of the known type, having an annular shape around an axis, is shown in the patent application DE-C-19539056 and comprises:
  a first support ring having a first annular fixing portion, adapted to be connected in use to the rotating member;
  a second support ring having a second annular fixing portion, radially more external than the first fixing portion and adapted to be connected in use to the fixed member;
  a first annular elastomeric element carried by the first support ring and defining two annular sealing lips cooperating with the second fixing portion to counter, in use, the passage of external contaminants towards the ambient containing the lubricant; and
  a second annular elastomeric element carried by the second support ring and defining a further annular sealing lip cooperating with the first fixing portion of the first support ring to counter, in use, the passage of lubricant to the outside.

The second elastomeric element further comprises a further sealing lip adapted to cooperate with the first fixing portion of the first support ring to prevent external contaminants from reaching the adjacent lubricant sealing lip.

The aforesaid gaskets, although being functionally effective, are susceptible of further improvements, in particular as regards the number of working hours they can guarantee under the aforesaid severe operating conditions.

SUMMARY OF THE INVENTION

The object of the present invention is a sealing gasket, which simply and economically allows to meet the aforesaid requirement.

Said object is achieved by the present invention in that it relates to a sealing gasket as defined in claim 1.

BRIEF DESCRIPTION OF THE DRAWINGS

For a better understanding of the present invention, in the following four favourite embodiments are described, purely by way of non-limiting examples and with reference to the accompanying drawings, in which.

DETAILED DESCRIPTION OF THE INVENTION

Figure 1:
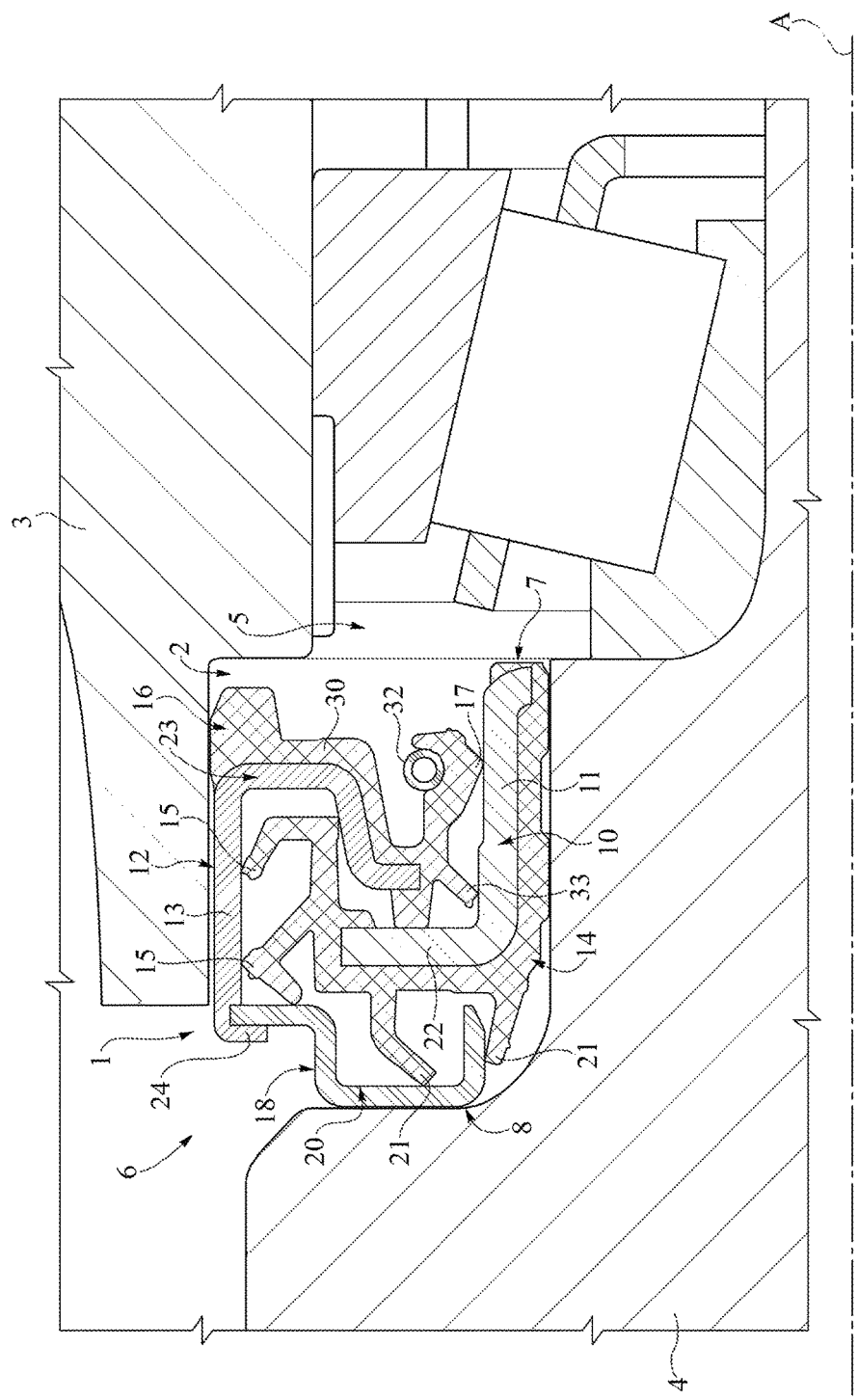
FIG. 1 is an axial half-section of a sealing gasket according to the present invention, mounted in use between a rotating member and a fixed member to seal the compartment between them.

In FIG. 1, 1 indicates as a whole a sealing gasket housed in the compartment 2 defined between an annular fixed member 3 having an axis A and a rotating member 4, for example a shaft of a vehicle, coaxially housed inside the member 3.

The compartment 2 connects two ambients 5, 6 arranged on axially opposite sides of the gasket 1 with reference to the axis A; in the shown case, the ambient 5 (to the right in FIG. 1) contains a lubricant, whereas the ambient 6 (to the left in FIG. 1) directly communicates with the outside.

The gasket 1 is adapted to seal the compartment 2 to prevent the passage of lubricant from the ambient 5 to the ambient 6, and to counter the passage of external contaminants from the ambient 6 to the ambient 5.

The gasket 1 has an annular configuration around the middle axis A and has a first and a second opposite axial end 7, 8, in use respectively facing the ambients 5 and 6.

Figure 2:
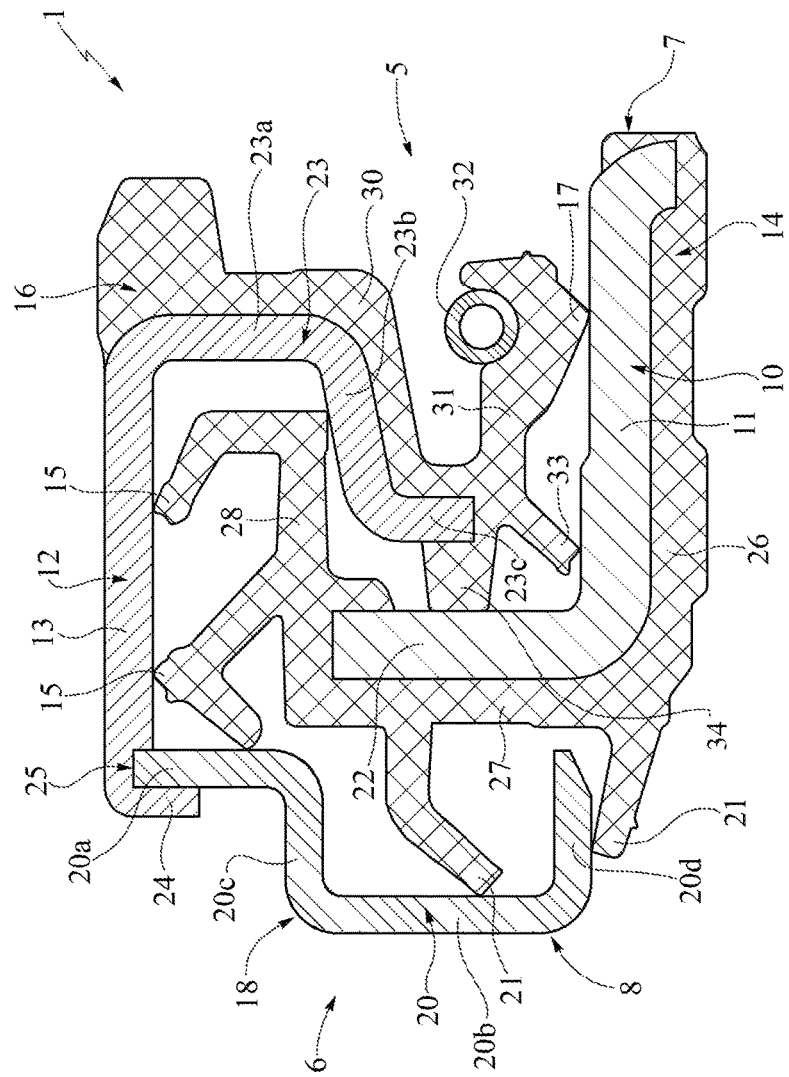
FIG. 2 is an axial half-section on an enlarged scale of the gasket of FIG. 1.

With reference to FIGS. 1 and 2, the gasket 1 comprises:
  an internal support ring 10, made of rigid material, having an annular fixing portion 11 adapted to be connected in use to the member 4;
  1an external support ring 12, made of rigid material, having an annular fixing portion 13 radially more external than the fixing portion 11 and adapted to be connected in use to the member 3;
  an annular elastomeric element 14 carried by the support ring 10 and having one or more annular sealing lips 15 cooperating with the fixing portion 13 of the support ring 12 to counter, in use, the passage of external contaminants from the ambient 6 to the ambient 5; and
  an annular elastomeric element 16 carried by the support ring 12 and having one or more annular sealing lips 17 cooperating with the fixing portion 11 of the support ring 10 to counter, in use, the passage of lubricant from the ambient 5 to the ambient 6.

According to a possible alternative not shown, the member 3 may be rotating and the member 4 may be fixed.

Advantageously, the gasket 1 further comprises:
  an additional support ring 18, made of rigid material, distinct from the support rings 10, 12, defining at least partially the axial end 8, coupled to the fixing portion 13 of the support ring 12 and having an annular shield portion 20 extending from the fixing portion 13 to the axis A; and one or more further annular sealing lips 21 overhangingly projecting from the elastomeric element 14 and cooperating with the shield portion 20 of the support ring 18 to counter, in use, the passage of external contaminants from the ambient 6 towards the sealing lips 15.

In particular, in the example shown in FIGS. 1 and 2, the fixing portions 11, 13 of the support rings 10, 12 extend parallel to the axis A, i.e. they have an axial development.

In the present description and in the claims, the term "axial" is used to indicate portions which extend parallel to the axis A of the gasket 1, regardless of the fact that these portions may comprise shoulders or steps of reduced size, that do not substantially modify their axial development.

Moreover, in the present description and in the claims, the term "cooperate" and its derivatives are always used to indicate a cooperation with contact, namely a direct contact between the cooperating parts.

Preferably, the support rings 10, 12, 18 are made of metallic material; it is also possible that at least one of them is wholly or partially made of plastic material or includes plastic inserts.

The support ring 10 further comprises an annular radial portion 22, overhangingly projecting towards the fixing portion 13 of the support ring 12 from one end of the fixing portion 11 adjacent to the shield portion 20 of the support ring 18; moreover, the radial portion 22 is connected to the fixing portion 11 by means of a curved section.

The support ring 12 further comprises an annular protruding portion 23 overhangingly projecting from the fixing portion 13 towards the axis A and towards the fixing portion 11 of the support ring 10, facing the shield portion 20 of the support ring 18 and carrying the elastomeric element 16.

In particular, the protruding portion 23 extends from one end of the fixing portion 13 adjacent to the axial end 7 of the gasket 1 and comprises, proceeding towards the fixing portion 11:

an annular radial region 23a, parallel to the lying plane of the radial portion 22 of the support ring 10 but radially and axially distant from the radial portion 22;

a truncated-conical region 23b extending towards the radial portion 22 from one end of the radial region 23a opposite to the fixing portion 13 and having a tapered profile towards the radial portion 22; and an annular radial end region 23c, extending from the area having the smaller section of the truncated-conical region 23b towards the fixing portion 11 and facing the radial portion 22.

The support ring 12 further comprises an annular radial portion 24, which overhangingly projects from the end of the fixing portion 13 opposite to the one from which the protruding portion 23 extends and has, in a radial direction with respect to the axis A, a smaller extension than the protruding portion 23.

Moreover, the support ring 12 has an annular cavity 25 formed on the surface of the fixing portion 13 facing the inside of the gasket 1 and adjacent to the radial portion 24.

In the embodiment of FIGS. 1 and 2, the support ring 18 is fully defined by the shield portion 20, which engages, with one of its ends, the annular cavity 25 of the fixing portion 13 of the support ring 12.

In detail, the shield portion 20 comprises, proceeding from the fixing portion 13 of the support ring 12 towards the axis A:

an annular radial area 20a, directly fixed to said fixing portion 13, radially overhangingly projecting from this latter and defining the end engaged in the annular cavity 25 of the fixing portion 13;

a further annular radial area 20b, axially and radially distant from the radial area 20a and parallel and facing the radial portion 22 of the support ring 10;

an annular axial joining area 20c between the radial areas 20a and 20b; and an annular axial free end area 20d, adjacent to the radial area 20b and parallel and facing the joining area 20c.

More specifically, the radial area 20a is axially more internal with respect to the gasket 1 than the radial area 20b with respect to the axis A; in this way, the radial area 20b defines the axial end 8 of the gasket 1.

As shown in FIGS. 1 and 2, the radial area 20b, the free end area 20d and the joining area 20c of the shield portion 20 of the support ring 18 define, in cross half-section, a C-shape with concavity facing the axial end 7 of the gasket 1.

The elastomeric element 14 comprises:

an annular axial portion 26, radially interposed between the fixing portion 11 of the support ring 10 and the member 4;

an annular radial portion 27 covering the radial portion 22 of the support ring 10 on the side facing the shield portion 20 of the support ring 18; and an annular free end portion 28 covering the free end of the radial portion 22 of the support ring 10 and overhangingly projecting from the radial portion 22 towards the axial end 7 of the gasket 1.

The axial portion 26 of the elastomeric element 14 defines a static seal between the gasket 1 and the member 4.

Preferably, the sealing lips 21 are two in number and overhangingly extend towards the shield portion 20 of the support ring 18 from the radial portion 27 of the elastomeric element 14.

Advantageously, the free end area 20d of the shield portion 20 is radially interposed between the sealing lips 21.

Furthermore, the sealing lips 21 are mutually convergent towards the axial end 8 of the gasket 1.

In more detail, one of the sealing lips 21 cooperates with the radial area 20b of the shield portion 20, whereas the other sealing lip 21 cooperates with the free end area 20d.

Preferably, the sealing lips 15 are two in number and overhangingly extend from the end portion 28 of the elastomeric element 14 to cooperate with the fixing portion 13 of the support ring 12.

In the embodiment shown in FIGS. 1 and 2, one of the sealing lips 15, the one nearer to the support ring 18, also cooperates with the radial area 20a of the shield portion 20. The other sealing lip 15 preferably cooperates also with the truncated-conical region 23b of the protruding portion 23 of the support ring 12.

The elastomeric element 16 comprises:

an annular shaped portion 30, covering the protruding portion 23 of the support ring 12 on the side facing the axial end 7 of the gasket 1; and an annular free end portion 31, covering on both sides the end region 23c of the protruding portion 23 and overhangingly projecting from the end region 23c towards the axial end 7 of the gasket 1.

In particular, the shaped portion 30 defines a static seal between the gasket 1 and the member 3 in the area adjacent to the fixing portion 13 of the support ring 12.

The end portion 31 of the elastomeric element 16 defines, on the side facing the axial end 8 of the gasket 1, an axial shock-absorbing pad 34 to contact in use the radial portion 22 of the support ring 10. This shock-absorbing pad 34 provides an additional barrier to the passage of external contaminants from the ambient 6 to the ambient 5.

The end portion 31 is overhangingly provided with a single annular sealing lip 17 for the lubricant present in the ambient 5, which is pressed onto the fixing portion 11 of the support ring 10 by an annular spring 32.

The end portion 31 has a further annular sealing lip 33 against external contaminants, axially interposed between the sealing lip 17 and the radial portion 22 of the support ring 10. The sealing lip 33 overhangingly extends from the end portion 31 and cooperates with the fixing portion 11 of the support ring 10.

The sealing lips 15, 17, 21, 33 define a dynamic seal between the moving part of the gasket 1 (in the shown example, the support ring 10 and the elastomeric element 14) and the fixed part (in the shown example, the support rings 12 and 18 and the elastomeric element 16).

In the shown example, the sealing lips 15, 21 and 33 all have truncated-conical shapes in the portion interacting with the respective support rings 10, 12 and 18; in more detail, the sealing lip 21 cooperating with the radial area 20b of the shield portion 20, the sealing lip 33 and the sealing lip 15 adjacent to the axial end 8 of the gasket 1 have decreasing diameters towards the axial end 8; the sealing lip 21 cooperating with the free end area 20d of the shield portion 20 and the sealing lip 15 adjacent to the axial end 7 of the gasket 1 have decreasing diameters towards the axial end 7.

Figure 3:
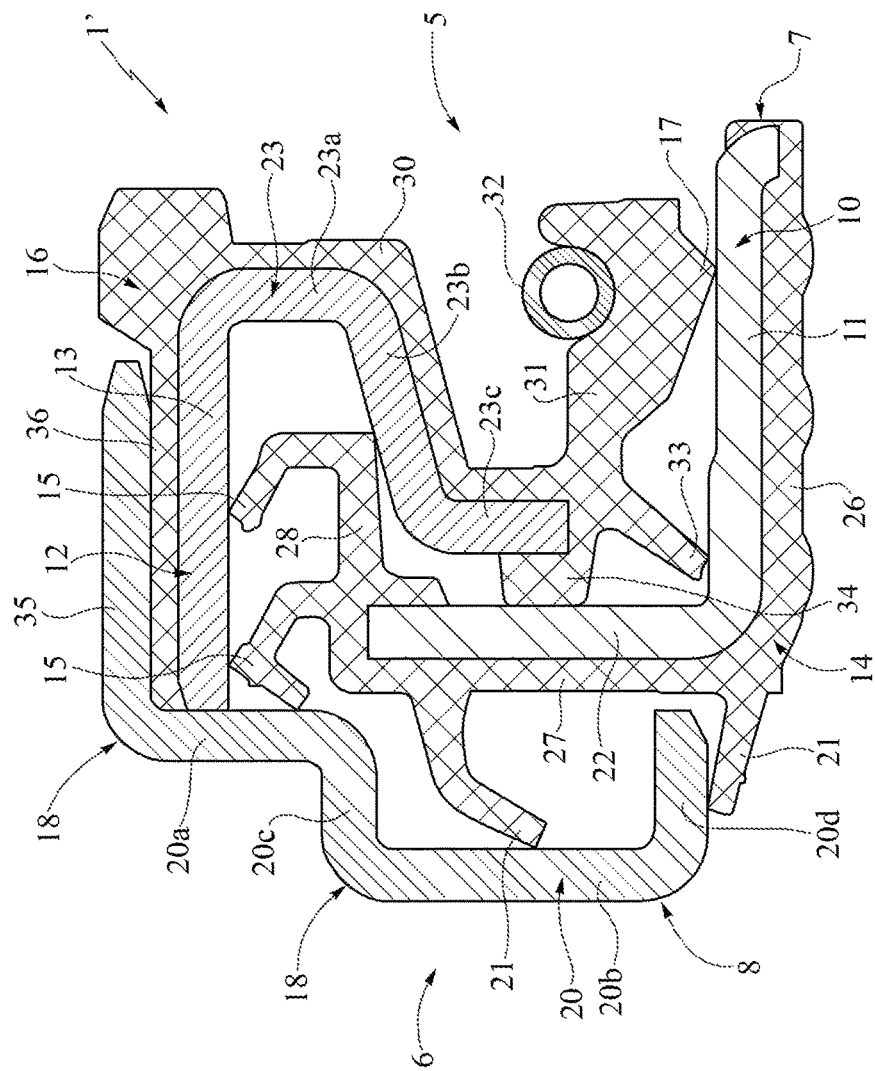
FIGS. 3 to 5 are half-sections, analogous to FIG. 2 and illustrating further embodiments of the gasket according to the present invention.

In FIG. 3, 1' indicates as a whole a different embodiment of a gasket according to the present invention, suitable to be housed in the compartment 2 to prevent the passage of lubricant from the ambient 5 to the ambient 6 and to counter the passage of external contaminants from the ambient 6 to the ambient 5; the gasket 1' is described hereinafter only insofar as it differs from the gasket 1, indicating with the same reference numbers parts identical or equivalent to parts already described.

In particular, the gasket 1' differs from the gasket 1 essentially because the support ring 18 further comprises an annular axial fixing portion 35 radially more external than the fixing portion 13 of the support ring 12 and adapted to be connected in use to the member 3.

In more detail, the elastomeric element 16 further comprises an annular axial portion 36 interposed between the fixing portions 35 and 13.

Figure 4:
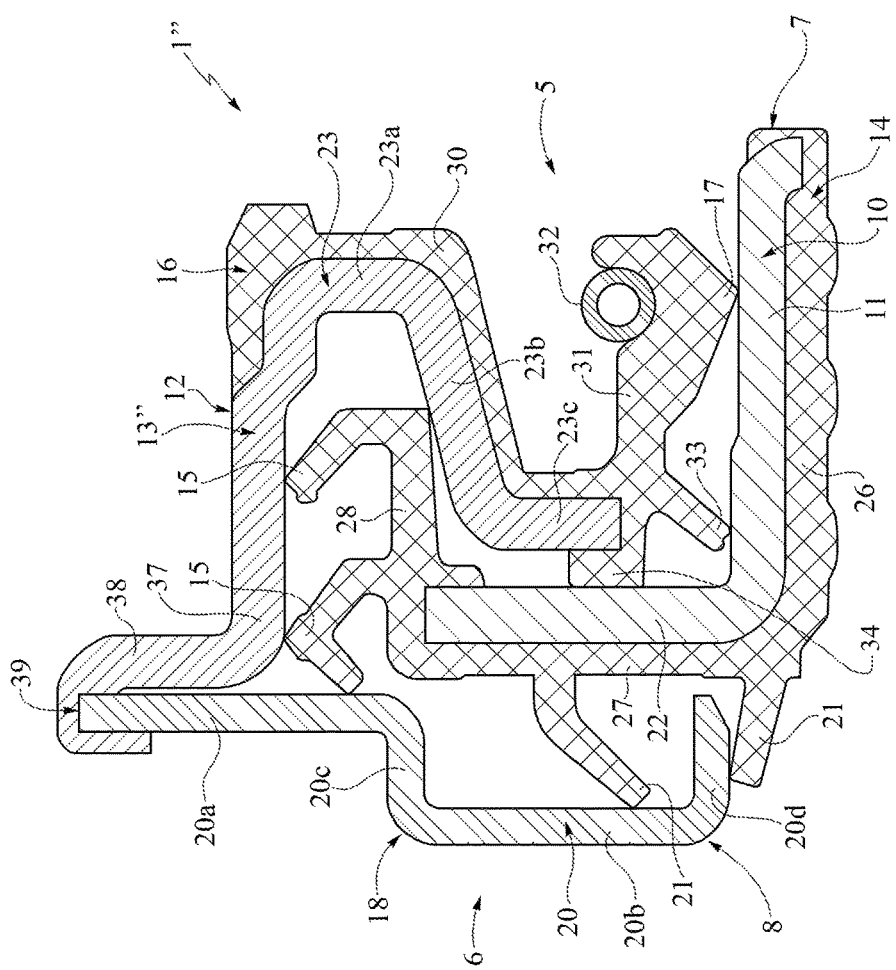

In FIG. 4, 1" indicates as a whole a different embodiment of a gasket according to the present invention, suitable to be housed in the compartment 2 to prevent the passage of lubricant from the ambient 5 to the ambient 6 and to counter the passage of external contaminants from the ambient 6 to the ambient 5; the gasket 1" is described hereinafter only insofar as it differs from the gasket 1, indicating with the same reference numbers parts equal or equivalent to parts already described.

In particular, the gasket 1" differs from the gasket 1 essentially because the support ring 12 comprises an annular fixing portion 13" in turn including:
  an annular axial region 37 corresponding to the fixing portion 13 of the gasket 1, extending parallel to the axis A and adapted to be connected to the member 3; and
  an annular retention appendix 38 adapted to receive the radial area 20a of the shield portion 20 of the support ring 18 and radially projecting in the opposite direction with respect to the axis A starting from one end of the axial region 37 adjacent to the axial end 8 of the gasket 1".

In particular, in axial half-section, the retention appendix 38 is approximately U-shaped with concavity facing the axis A and defining an annular cavity 39 for engaging the radial area 20a of the shield portion 20 of the support ring 18.

Figure 5:
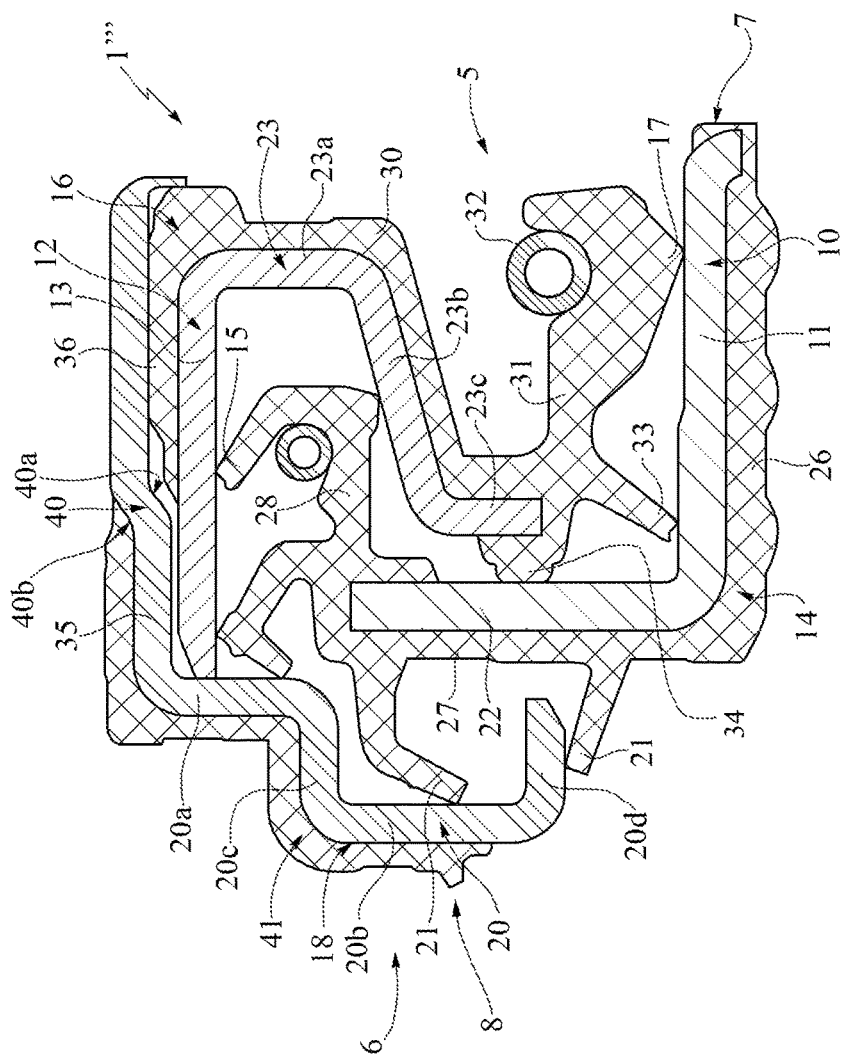

In FIG. 5, 1'" indicates as a whole a further embodiment of a gasket according to the present invention, suitable to be housed in the compartment 2 to prevent the passage of lubricant from the ambient 5 to the ambient 6 and to counter the passage of external contaminants from the ambient 6 to the ambient 5; the gasket 1'" is described hereinafter only insofar as it differs from the gasket 1', indicating with the same reference numbers parts equal or equivalent to parts already described.

In particular, the gasket 1'" differs from the gasket 1' essentially because:
  the fixing portion 35 of the support ring 18 has a rounded intermediate step 40 defining respective annular shoulders 40a, 40b facing the opposite axial ends 7, 8 of the gasket 1'";
  the axial portion 36 of the elastomeric element 16 covers the fixing portion 13 of the support ring 12 up to the annular shoulder 40a; and
  a further annular elastomeric element 41 is provided, which covers at least part of the support ring 18 on the side facing the outside of the gasket 1'".

In more detail, the elastomeric element 41 covers the areas 20a, 20b and 20c of the shield portion 20 and the part of the fixing portion 35 between the end from which the radial area 20a originates and the annular shoulder 40b.

As shown in FIG. 5, the axial end of the support ring 18 adjacent to the axial end 7 of the gasket 1'" is radially bent towards the axis A so as to cooperate with the elastomeric element 16, and make the latter not separable from the gasket 1'".

In use, any external contaminant coming from the ambient 6 should overcome the barriers represented by the two sealing lips 21, by the two sealing lips 15 and by the sealing lips 33 and 17 before reaching the ambient 5.

The increased number of barriers represented by the sealing lips 15, 17, 21, 33 and by the shock-absorbing pad 34 with respect to the known solutions is obtained with a very small increase of the axial dimensions of the gaskets 1, 1', 1'" and maintaining the same radial dimensions of the known solutions. In the embodiment of FIG. 4, the retention appendix 38 generates a small increase of the radial dimensions of the gasket 1".

Furthermore, the particular arrangement of the free end area 20d of the shield portion 20 between the two sealing lips 21 not only ensures an additional barrier against the entrance of external contaminants in the gasket 1, 1', 1", 1'", but also allows a centrifugation of what has possibly entered the ambient 6. In particular, such a centrifugation is performed by the sealing lip 21 cooperating with the free end area 20d of the shield portion 20; the other sealing lip 21, cooperating with the radial area 20b, acts as a typical barrier against the entrance of contaminants in the gasket 1, 1', 1", 1'".

The different solutions here described and shown provide, compared to the known solutions, a substantial increase of the number of working hours of the gaskets 1, 1', 1", 1'" under severe conditions, namely on excavators or working machines, usually operating, for example, on muddy terrain.

Thanks to the fact that one of the sealing lips 15 cooperates with both the support rings 12 and 18, the contact of said sealing lip 15 is always guaranteed with at least one of the two support rings 12, 18 in the event of eccentricity problems with the assembly. By creating a double contact with the support rings 12, 18, this sealing lip 15 ensures a double protection under optimal conditions.

Thanks to the fact that the support rings 12 and 18 are distinct pieces, one of the two could be made of a stainless material. For the same reason, the two support rings 12, 18 could be made with different configurations suiting the various purposes.

Finally, it is clear that the gaskets 1, 1', 1", 1''' here described and shown can be subject to modifications and variations without departing from the scope of protection defined by the appended claims.

What is claimed is:

1. A gasket for sealing a compartment between two members, one fixed and the other rotating, so as to prevent the passage of lubricant from a first ambient to a second ambient, arranged on opposite sides of said compartment, and to at least hinder the passage of external contaminants from said second ambient to said first ambient, said gasket having an annular configuration about a middle axis and having a first and a second axial opposite ends adapted to be arranged, in use, facing said first and second ambient, respectively, said gasket comprising:
  a first support ring made of rigid material, having a first annular fixing portion, adapted to be connected, in use, to a first of said members;
  a second support ring made of rigid material, having a second annular fixing portion, radially more external than said first fixing portion and adapted to be connected, in use, to a second of said members;
  a first annular elastomeric element carried by the first support ring and defining at least a first annular sealing lip in direct contact with said second fixing portion of said second support ring to counter, in use, the passage of external contaminants from said second ambient to said first ambient;
  a second annular elastomeric element carried by the second support ring and defining at least a second annular sealing lip in direct contact with the first fixing portion of said first support ring to counter, in use, the passage of lubricant from said first ambient to said second ambient;
  a third support ring made of rigid material, distinct from said first and second support rings, defining at least partially said second axial end of the gasket, coupled to said second fixing portion of said second support ring and having an annular shield portion extending from the second fixing portion towards said axis; and
  at least a third annular sealing lip overhangingly projecting from said first elastomeric element and in direct contact with said shield portion of said third support ring to counter, in use, the passage of external contaminants from said second ambient towards said first sealing lip;
  wherein said first annular sealing lip is also in direct contact with said shield portion of said third support ring.

2. A gasket according to claim 1, wherein said first elastomeric element comprises two of said third sealing lips in direct contact with said shield portion of said third support ring; and
  wherein said shield portion of said third support ring has a free end area adjacent to said first fixing portion of said first support ring and radially interposed between said third sealing lips.

3. A gasket according to claim 1, wherein said first support ring comprises an annular radial portion overhangingly extending towards said second fixing portion of said second support ring starting from an end of the first fixing portion adjacent to said shield portion of said third support ring;
  wherein said first elastomeric element has an annular radial portion covering said radial portion of said first support ring on the side facing said shield portion of said third support ring; and
  wherein said third sealing lips overhangingly extend towards said shield portion starting from said radial portion of said first elastomeric element.

4. A gasket according to claim 2, wherein said free end area of said shield portion extends parallel to said axis in a position radially interposed between said third sealing lips.

5. A gasket according to claim 2, wherein said shield portion of said third support ring comprises a first radial area, parallel to and facing the radial portion of said first support ring; and
  wherein one of said third sealing lips is in direct contact with said first radial area of said shield portion, and the other of said third sealing lips is in direct contact with said free end area of the shield portion.

6. A gasket according to claim 5, wherein said first radial area of said shield portion of said third support ring is adjacent to said free end area, and wherein said shield portion further comprises:
  a second annular radial area adjacent to said second fixing portion of said second support ring and spaced from the first radial area in a direction parallel to said axis; and
  an annular axial joining area between said first and second radial areas.

7. A gasket according to claim 6, wherein the first radial area, the free end area and the joining area of said shield portion of said third support ring define, in an axial semi-section, a C-shape with concavity facing the first axial end of the gasket.

8. A gasket according to claim 6, wherein said second radial area of said shield portion is directly fixed to said second fixing portion of said second support ring and radially overhangingly projects from the second fixing portion.

9. A gasket according to claim 8, wherein said second fixing portion of said second support ring has an annular engaging cavity for said second radial area of said third support ring.

10. A gasket according to claim 9, wherein said second fixing portion of said second support ring comprises:
  an axial area adapted to be connected to the second rotating member and extending parallel to said axis; and
  a retention appendix for said second radial area of said shield portion of said third support ring; and wherein said retention appendix radially protrudes in an opposite direction with respect to said axis starting from said axial area of said second fixing portion in position adjacent to the second axial end of the gasket, and defines said annular cavity.

11. A gasket according to claim 1, wherein said first and second fixing portions extend parallel to said axis.

12. A gasket according to claim 11, wherein said third support ring further comprises a third annular axial fixing portion, radially more external than said second fixing portion of said second support ring and adapted to be connected, in use, to said second member.

13. A gasket according to claim 12, wherein said second elastomeric element is partially interposed between said second and third fixing portions.

14. A gasket according to claim 1, further comprising a third elastomeric element covering at least partially the third support ring on the side facing the outside of said gasket.

15. A gasket according to claim 3, wherein said first elastomeric element comprises an annular free end portion covering the free end of said radial portion of said first support ring and overhangingly projecting from the radial portion towards said first axial end of the gasket; and wherein said first sealing lip overhangingly extends from said end portion of said first elastomeric element.

16. A gasket according to claim 15, wherein said first sealing lip is also in direct contact with said shield portion of said third support ring.

17. A gasket according to claim 1, wherein said second support ring comprises an annular protruding portion extending from said second fixing portion towards said axis, facing said shield portion and carrying said second elastomeric element.

18. A gasket according to claim 17, wherein said second elastomeric element comprises an annular free end portion covering the free end of said protruding portion and overhangingly carrying said second sealing lip.

19. A gasket according to claim 18, wherein said end portion of said first elastomeric element is provided with two said first sealing lips in direct contact with said second fixing portion; and wherein said end portion of said second elastomeric element comprises a fourth annular sealing lip in direct contact with said first fixing portion.

20. A gasket for sealing a compartment between a first member and a second member, said gasket having an annular configuration about a middle axis and having a first axial end and a second axial end opposite the first axial end, said gasket comprising:
- a first support ring formed of rigid material, the first support ring having a first annular fixing portion adapted to be connected to the first member;
- a second support ring formed of rigid material, the second support ring having a second annular fixing portion radially more external than said first fixing portion and adapted to be connected to the second member;
- a first annular elastomeric element attached to the first support ring, the first annular elastomeric element comprising a first annular sealing lip in direct contact with said second fixing portion of said second support ring;
- a second annular elastomeric element attached to the second support ring, the second annular elastomeric element comprising a second annular sealing lip in direct contact with the first fixing portion of said first support ring;
- a third support ring formed of rigid material and distinct from said first and second support rings, the third support ring at least partially forming said second axial end of the gasket and coupled to said second fixing portion of said second support ring and having an annular shield portion extending from the second fixing portion towards said axis; and
- at least a third annular sealing lip projecting axially from said first elastomeric element and in direct contact with said shield portion of said third support ring;
- wherein said first annular sealing lip is also in direct contact with said shield portion of said third support ring.

* * * * *